United States Patent [19]

Harris et al.

[11] Patent Number: 5,489,806
[45] Date of Patent: Feb. 6, 1996

[54] AIRBAG HORN SWITCH WITH TEMPERATURE COMPENSATION

[75] Inventors: Bradley D. Harris, Farmington; Marcus T. Clark, Kaysville, both of Utah

[73] Assignee: Morton International, Inc., Chicago, Ill.

[21] Appl. No.: 240,879

[22] Filed: May 11, 1994

[51] Int. Cl.⁶ .................................................. B60R 21/20
[52] U.S. Cl. ........................ 307/10.1; 307/9.1; 307/116; 307/117; 280/731; 280/735; 200/61.54
[58] Field of Search .................................. 307/9.1, 10.1, 307/116, 111, 119; 180/268, 271; 280/728.1, 728.2, 728.3, 729, 730.1, 730.2, 731, 732, 733–735, 738, 739, 745.1, 750; 340/438, 449, 384.6, 384.7; 200/61.54, 61.55, 61.56

[56] References Cited

U.S. PATENT DOCUMENTS

| Re. 35,031 | 9/1995 | Winget | 280/731 |
|---|---|---|---|
| 3,819,205 | 6/1974 | Dunford et al. | 280/731 |
| 4,575,117 | 3/1986 | Uchida | 280/61.54 |
| 4,616,224 | 10/1986 | Reighard | 307/10.1 |
| 5,002,306 | 3/1991 | Hiramitsu et al. | 200/61.54 |
| 5,062,661 | 11/1991 | Winget | 280/731 |
| 5,157,372 | 10/1992 | Langford | 338/211 |
| 5,232,243 | 8/1993 | Blackburn et al. | 280/732 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 |
| 5,350,190 | 9/1994 | Szigethy | 280/728 |
| 5,398,962 | 3/1995 | Kropp | 280/731 |

*Primary Examiner*—William M. Shoop, Jr.
*Assistant Examiner*—Peter Ganjoo
*Attorney, Agent, or Firm*—George W. Rauchfuss, Jr.; Gerald K. White

[57] ABSTRACT

A pressure activated switch is positioned for actuation of a horn in the steering wheel of a motor vehicle. The switch is mounted on an airbag cover and generates a signal when the switch is activated by the deflection of the cover. A temperature sensing device is positioned on the cover for generating a signal indicative of the cover temperature. The temperature signal is utilized for changing the actuation pressure or deflection required on the pressure or deflection activated switch to compensate for changes in cover stiffness due to the temperature changes of the cover. The invention is thus directed to providing a consistent horn actuation force regardless of the temperature of the airbag cover to which such force is applied to actuate the horn of the motor vehicle.

21 Claims, 2 Drawing Sheets

AIRBAG HORN SWITCH WITH TEMPERATURE COMPENSATION

FIELD OF THE INVENTION

This invention relates to a temperature compensated pressure or deflection sensitive activation of a switch in a steering wheel assembly of a motor vehicle, particularly to a temperature compensated pressure or deflection sensitive activation of a horn switch in an airbag containing steering wheel assembly in a motor vehicle.

BACKGROUND OF THE INVENTION

This invention relates to a horn actuator incorporated in an airbag unit which is mounted in a steering wheel of a motor vehicle, and more particularly to such an actuator in the form of a pressure or deflection sensitive switch which is provided with temperature compensation.

With the advent of the airbag, steering wheels became the most convenient location for mounting a driver's side airbag. Most often the airbag is mounted in the hub of the steering wheel. Since the steering wheel had also been a convenient location for other controls such as horn switches, the incorporation of airbag units within the steering wheel initially required the hardware for horn actuation to be moved from the center to small buttons on the steering wheel spokes. Since drivers are used to and feel more comfortable with the horn switch more centrally located on the steering wheel, technology has turned to attempting to put the horn actuation function back in the center of the steering wheel.

One approach is to incorporate some form of pressure or deflection sensitive switch in the airbag cover at the hub of the steering wheel which, when deflected, actuates the horn. Among the problems with this approach is that as the cover changes temperature, the force required to activate the horn changes. This change is due to the changes in stiffness of the plastic cover itself with temperature. The lack of consistency in the horn blowing function could frustrate the vehicle operator and in some cases might cause an accident if the operator fails to actuate the horn as quickly as required due to different force actuation requirements.

SUMMARY OF THE INVENTION

Accordingly, it is an object of this invention to provide a new and improved airbag horn switch which provides a consistent horn actuation force regardless of the temperature of the cover to which the actuator is attached.

A further object of this invention is to provide a new and improved pressure or deflection sensitive horn switch with temperature compensation to compensate for changes in the plastic airbag cover stiffness due to changes in temperature.

In carrying out this invention in one illustrative embodiment thereof a temperature compensated airbag horn switch assembly, which includes a pressure or deflection sensitive switch positioned for actuation of a horn in the steering wheel of a motor vehicle, is provided in the cover housing of an airbag module. The airbag module cover carries the pressure or deflection sensitive switch which generates a signal when the switch is actuated by deflection of the cover. A temperature sensing device associated with the cover generates a signal indicative of the cover temperature. Means are provided for changing the actuation pressure or deflection required on the pressure sensitive switch in order to actuate the switch based on the temperature of the cover to compensate for changes in the cover stiffness due to temperature changes of the cover.

BRIEF DESCRIPTION OF THE DRAWINGS

The invention, together with further objects, advantages, aspects and features thereof, will be more clearly understood from the following description taken in connection with the accompanying drawings.

DESCRIPTION OF THE PREFERRED EMBODIMENTS

Figure 1:
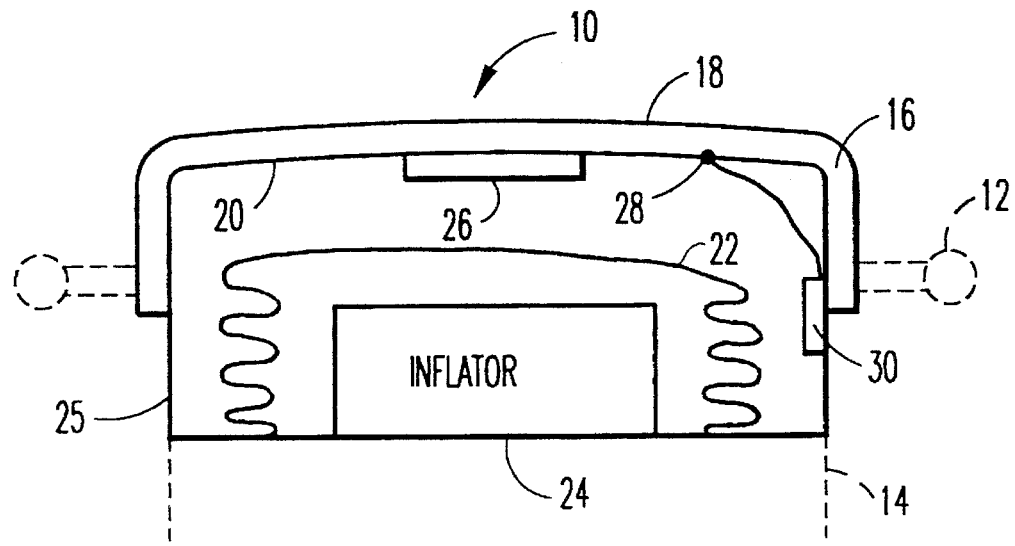
FIG. 1 is an idealized cross-sectional view of the airbag horn switch with temperature compensation in accordance with the present invention illustrating the steering wheel and steering column in phantom.

Referring now to FIG. 1, an airbag horn switch assembly, referred to generally with the reference numeral 10, is mounted on the hub of a steering wheel 12 (in phantom) on a steering column 14 (in phantom) of a motor vehicle.

The airbag horn switch assembly 10 includes an airbag cover 16 having an outer surface 18 and an inner surface 20. The airbag cover 16 has a tear line (not shown) which is adopted to open on the deployment of an airbag 22 housed within a housing 25 mounted in the hub of the steering column 14 and the steering wheel 12. The housing 25 also contains an inflator 24 for the airbag 22. The airbag 22 is operably connected about the inflator 24 to receive gas emanating from the inflator 24 when the inflator is activated.

In accordance with the present invention, a pressure or deflection sensitive sensor 26 is mounted on the inner surface 20 of the airbag cover 16. The outer or upper surface 18 of the cover 16 is deflected to activate the pressure or deflection sensitive sensor or switch 26. The sensor 26 may be mounted to the inner surface 20 of the cover 16 by any suitable means such as embedding, molding, heat staking, and the like, which insures that when the cover 16 separates on the deployment of the airbag 22 that the sensor 26 will not be dislodged and fly out with the 10 inflated airbag. Several types of sensors may be employed such as piezoelectric, resistance pressure, resistance deflection, strain gauges, and the like. The function of the sensor 26 is simple, namely, as the plastic cover 16 has a force applied by the driver on the outer surface 18 of the cover 16, such force or deflection activates the switch or sensor 26 generating some form of analog deflection signal. Accordingly, the sensor or switch 26 is activated when the driver pushes or applies a force to the cover 16 with the cover reacting to the force. However, the reaction of the cover 16 and ultimately the sensor 26 is temperature dependent. The colder the plastic cover 16, the more force is required to deflect the cover and actuate the sensor 26.

To address the dependency of the cover 16 on temperature, a temperature sensing device 28 is connected to a temperature sensing circuit 30 which is part of the sensor activation circuit provided in the steering column housing with the temperature sensing device 28 coupled to the cover 16 for detecting the temperature thereof. The function of the temperature sensing device 28, such as a thermistor, is to measure the temperature of the cover in proximity to the horn actuation area on the outer surface 18 of the cover 16. The pressure or deflection sensitive sensor 26 is mounted in proximity to the horn actuation area on the inner surface 20 of the cover 16 along with the temperature sensing device 28.

Figure 2:
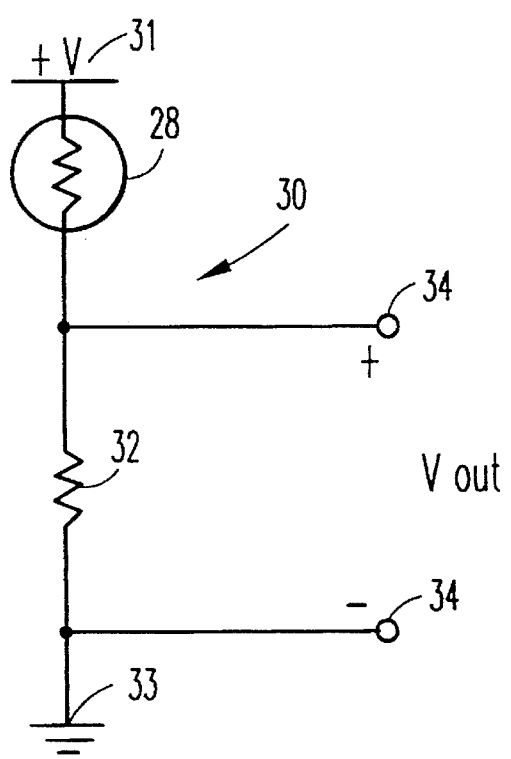
FIG. 2 is a circuit diagram of a typical temperature sensing circuit which may be utilized in the airbag horn system of FIG. 1.

FIG. 2 illustrates a typical temperature sensing circuit incorporating a thermistor 28 placed on the inner surface 20 of the cover 16 such that the thermistor will sense changes in the cover temperature. The circuit includes a thermistor 28 connected in series with a voltage dividing resistor 32 between a positive source of voltage 31 and ground 33. Voltage output terminals 34 are connected across the voltage dividing resistor 32. As the temperature increases or decreases, the output voltage across terminals 34 increases or decreases. This change in voltage is sensed and is used in turn to increase or decrease the horn actuation pressure or deflection requirement correspondingly.

Figure 3:
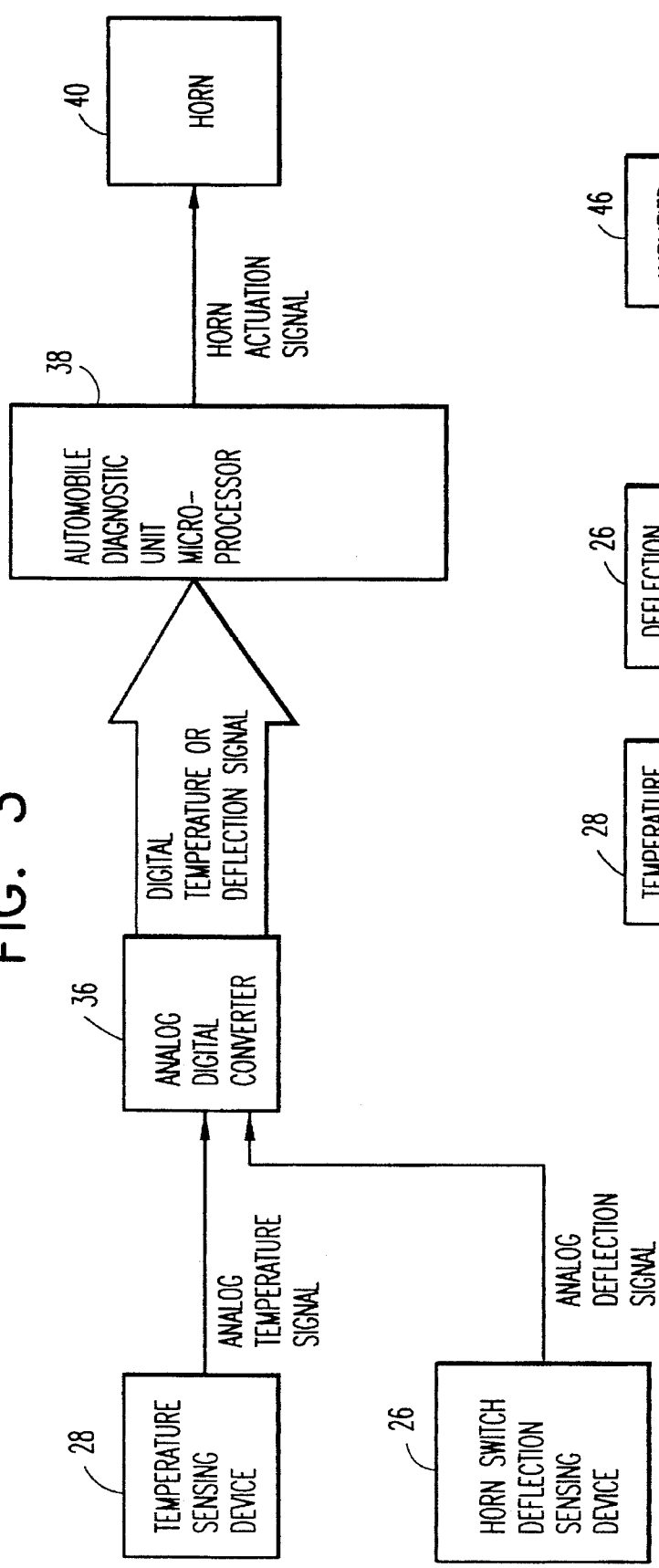
FIG. 3 is a block diagram illustrating the operation of the temperature compensated airbag horn switch assembly in accordance with the present invention.

Referring now to FIG. 3, analog sensor signals generated by the temperature sensing device 28 and the horn switch deflection sensing device 26 are fed to an analog/digital (A/D) converter 36 which is usually integrated into an automotive diagnostic unit microprocessor 38. The analog temperature and analog deflection signals are multiplexed one at a time through the A/D converter 36 into the microprocessor 38. Based on a customer definable algorithm which is programmed into the microprocessor 38, the microprocessor evaluates and compares the two signals to determine if the deflection of the cover surface 18 is sufficient, when compensating for change in cover stiffness due to temperature change of the cover surface 18, to actuate a horn 40. An independent microprocessor may also be employed which may process the analog signals directly from the sensors.

Figure 4:
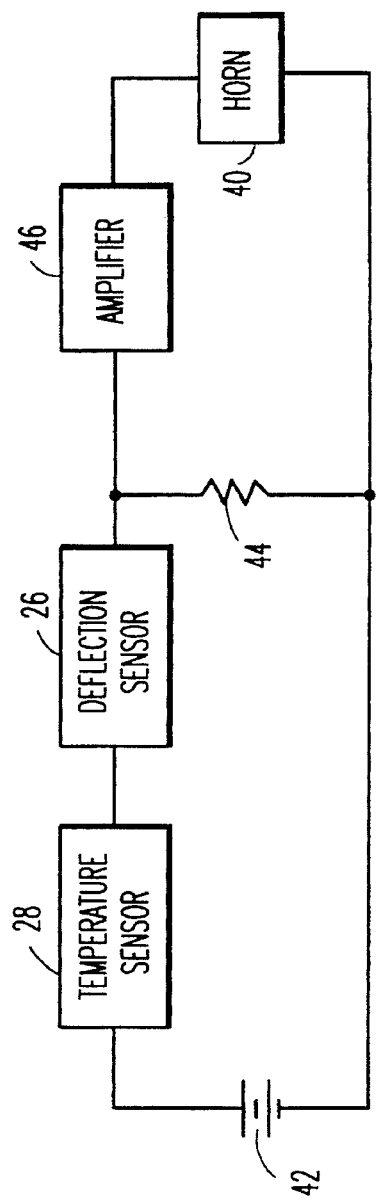
FIG. 4 is a block circuit diagram illustrating another embodiment of the present invention.

In the embodiment illustrated in FIG. 4, a microprocessor is not required. In this embodiment, the temperature sensor 28 and the deflection sensor 26 are connected in circuit between a source of potential 42 and a voltage divider resistor 44. The resistor 44 is coupled to a switching amplifier 46 which is level sensitive for actuating a horn 40.

The temperature sensor 28 operates in a manner whereby, as the temperature of the cover rises and is sensed by the temperature sensor, the resistance of said sensor will decrease. Also, as the temperature of the cover drops and is sensed by the temperature sensor 28, the resistance of said sensor increases. For the deflection sensor 26, when the temperature of the cover rises at a given exerted force, the deflection of the cover increases and the resistance of the deflection sensor increases. Conversely, when the temperature of the cover decreases and the cover becomes stiffer, the deflection at said given exerted force causes less deflection of the cover and the resistance of the deflection sensor 26 decreases. Thus, it will be appreciated that the two sensors 26 and 28 are set to counteract each other so that the total resistance of the two sensors combined remains constant with temperature changes of the cover. The circuit of FIG. 4 thus provides a constant resistance measured across sensors 26 and 28 for a given force input. This constant resistance is used in a voltage divider circuit taken off voltage divider resistor 44 to modify the voltage that actuates the horn 40. In this manner the invention permits the force required to actuate the horn to remain constant at various temperatures.

In operation, assuming that a constant force is being applied to the horn switch, at room temperature, the cover deflects a predictable amount in reaction to the constant force being applied. This is a result of the bending resistance of the cover at room temperature. The deflection sensor 26 will exhibit a resistance value related directly to the cover deflection. Thus, if the temperature is constant, the deflection is constant and so is the resistance of the deflection sensor 26.

If the temperature of the cover then drops, the resistance of the temperature sensor 26 increases thus requiring less resistance from the deflection sensor 26 and thereby requiring less deflection of the cover to actuate the horn. Thus, the same force, although producing less deflection of the cover, will still act to actuate operation of the horn 40 due to the increase of the resistance of temperature sensor 28 with the drop in temperature of the cover. Therefore, the same force on the cover will produce a total circuit resistance that remains constant for a given force input despite variations in temperature of the cover and thus will result in actuation of the horn at a specified exerted force because of the temperature compensated resistance produced by temperature sensor 28.

Accordingly, the present invention adds a temperature sensing device that in effect adjusts the amount of cover surface 18 deflection required to compensate for changes in the stiffness of the plastic airbag cover 16 due to changes in temperature. The temperature sensing device, such as the thermistor 28, is thus interrogated and adjustments are made in the microprocessor or circuit to compensate for the cover stiffness due to temperature. Thus, the purpose of the present invention is to maintain horn actuation force in a consistent manner regardless of temperature. Thus, whether the vehicle is driven in freezing temperatures before the interior of the car warms up or the motor vehicle is being driven in the tropics, the pressure required to activate the horn can remain essentially unchanged.

While the invention has been described in connection with temperature compensated pressure or deflection switch activation of a horn, it will be appreciated that this invention has applicability to provide for compensated pressure or deflection activation of a switch for any purpose in a motor vehicle steering wheel assembly.

Since other modifications and changes varied to fit particular operating requirements and environments will be apparent to those skilled in the art, the invention is not considered limited to the examples chosen for purposes of disclosure and covers all modifications and changes which do not constitute departure from the true spirit and scope of this invention.

We claim:

1. A temperature compensated pressure activated switch assembly positioned in a steering wheel of a motor vehicle comprising:

a cover mounted on the steering wheel of the motor vehicle;

a sensor mounted on said cover, said sensor having means for generating a signal indicative of pressure exerted to cause deflection of said cover;

a temperature sensing device associated with said cover for generating a signal indicative of temperature of the cover; and means for receiving said signals and controlling an activation pressure on said sensor required to activate said sensor based on the signal indicative of the temperature of said cover to compensate for changes in the cover stiffness due to temperature changes of said cover.

2. The temperature compensated switch assembly as claimed in claim 1 wherein said cover has an actuation area having a front and a rear surface with said sensor being mounted on said rear surface of said actuation area of said cover.

3. The temperature compensated switch assembly as claimed in claim 2 wherein said temperature sensing device is positioned in said actuation area of said cover for measuring the temperature of said cover.

4. The temperature compensated switch assembly as claimed in claim 1 wherein said temperature sensing device is a thermistor.

5. The temperature compensated switch assembly as claimed in claim 1 wherein said means for controlling said actuation pressure includes: an analog/digital converter receiving said signals from said sensor and said temperature sensing device and converting said signals to digital signals, and a microprocessor coupled to said analog/digital converter for receiving and processing said digital signals to evaluate whether the deflection of said cover, compensated for change in cover stiffness due to temperature change of the cover, is sufficient to activate a signalling device; and a signalling device coupled to said microprocessor for being activated upon a determination by said microprocessor that said deflection is sufficient, compensated for change in cover stiffness due to temperature change of the cover, to activate said signalling device.

6. A temperature compensated pressure activated horn switch assembly positioned in a steering wheel of a motor vehicle, which steering wheel houses an airbag module, said switch assembly comprising:

an airbag module cover mounted on the steering wheel of the motor vehicle;

a sensor mounted on said cover, said sensor having means for generating a signal indicative of pressure exerted to cause deflection of said cover;

a temperature sensing device associated with said cover for generating a signal indicative of temperature of the cover; and means for receiving said signals and controlling an activation pressure on said sensor required to activate said sensor based on the signal indicative of the temperature of said cover to compensate for changes in the cover stiffness due to temperature changes of said cover.

7. The temperature compensated pressure activated horn switch assembly as claimed in claim 6 wherein said airbag cover has a horn actuation area having a front and a rear surface with said sensor being mounted on said rear surface of said horn actuation area of said cover.

8. The temperature compensated pressure activated horn switch assembly as claimed in claim 2 wherein said temperature sensing device is positioned in said horn actuation area of said cover for measuring the temperature of said cover.

9. The temperature compensated pressure activated horn switch assembly as claimed in claim 8 wherein said temperature sensing device is a thermistor.

10. The temperature compensated pressure activated horn switch assembly as claimed in claim 6 wherein the means for controlling said actuating pressure includes an analog/digital converter receiving said signals from said sensor and said temperature sensing device and converting said signals to digital signals, and a microprocessor coupled to said analog/digital converter for receiving and processing said digital signals to evaluate whether the deflection of said cover, compensated for change in cover stiffness due to temperature change of the cover, is sufficient to activate a horn, and a horn coupled to said microprocessor for being activated upon a determination by said microprocessor that said deflection is sufficient, compensated for change in cover stiffness due to temperature change of the cover, to activate said horn.

11. The temperature compensated pressure activated horn switch assembly as claimed in claim 8 wherein the means for controlling said actuating pressure includes an analog/digital converter receiving said signals from said sensor and said temperature sensing device and converting said signals to digital signals, and a microprocessor coupled to said analog/digital converter for receiving and processing said digital signals to evaluate whether the deflection of said cover, compensated for change in cover stiffness due to temperature change of the cover, is sufficient to activate a horn, and a horn coupled to said microprocessor for being activated upon a determination by said microprocessor that said deflection is sufficient, compensated for change in cover stiffness due to temperature change of the cover, to activate said horn.

12. The temperature compensated pressure actuated horn switch assembly as claimed in claim 1 wherein said means for controlling said activation pressure includes means for coupling said sensor and said temperature sensing device in a circuit for generating an output voltage which is a function of the signals generated by said sensor and said temperature sensing device and a signaling means having said output voltage coupled thereto for utilizing said output voltage which is temperature compensated for changes in cover temperature for controlling the actuation of said signaling device.

13. The temperature compensated pressure activated horn switch assembly as claimed in claim 6 wherein said means for controlling said actuation pressure includes means for coupling said sensor and said temperature sensing device in a circuit for generating an output voltage which is a function of the signals generated by said sensor and said temperature sensing device and a horn having said output voltage coupled thereto which is temperature compensated for controlling the actuation of said horn.

14. The temperature compensated switch assembly as claimed in claim 1 wherein the sensor is a pressure sensitive sensor.

15. The temperature compensated switch assembly as claimed in claim 1 wherein the sensor is a deflection sensitive sensor.

16. The temperature compensated switch assembly as claimed in claim 5 wherein the sensor is a pressure sensitive sensor.

17. The temperature compensated switch assembly as claimed in claim 5 wherein the sensor is a deflection sensitive sensor.

18. The temperature compensated switch assembly as claimed in claim 6 wherein the sensor is a pressure sensitive sensor.

19. The temperature compensated switch assembly as claimed in claim 6 wherein the sensor is a deflection sensitive sensor.

20. The temperature compensated switch assembly as claimed in claim 11 wherein the sensor is a pressure sensitive sensor.

21. The temperature compensated switch assembly as claimed in claim 11 wherein the sensor is a deflection sensitive sensor.

* * * * *

UNITED STATES PATENT AND TRADEMARK OFFICE
CERTIFICATE OF CORRECTION

PATENT NO. : 5,489,806
DATED : 6 February 1996
INVENTOR(S) : Bradley D. Harris et al.

It is certified that error appears in the above-indentified patent and that said Letters Patent is hereby corrected as shown below:

At column 2, line 50, "10 inflated airbag." should be
--inflated airbag.--.

At column 2, line 67, "column housing" should be
--column housing 25,--.

Signed and Sealed this

Twenty-third Day of July, 1996

Attest:

BRUCE LEHMAN

Attesting Officer

Commissioner of Patents and Trademarks